(12) United States Patent
Pearson et al.

(10) Patent No.: US 9,628,516 B2
(45) Date of Patent: *Apr. 18, 2017

(54) POLICY-BASED DATA MANAGEMENT

(71) Applicant: HEWLETT PACKARD ENTERPRISE DEVELOPMENT LP, Houston, TX (US)

(72) Inventors: Siani Pearson, Llanvaches (GB); Archie Reed, Rhodes (AU); Marco Casassa Mont, Bristol (GB); Gina Kounga, Bristol (GB); Liqun Chen, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/919,258

(22) Filed: Oct. 21, 2015

(65) Prior Publication Data

US 2016/0112456 A1 Apr. 21, 2016

Related U.S. Application Data

(63) Continuation of application No. 14/125,685, filed on Dec. 12, 2013, now Pat. No. 9,203,621.

(51) Int. Cl.
*H04L 29/06* (2006.01)

(52) U.S. Cl.
CPC ............ *H04L 63/20* (2013.01); *H04L 63/045* (2013.01); *H04L 63/0442* (2013.01); *H04L 63/0464* (2013.01); *H04L 63/061* (2013.01); *H04L 63/0876* (2013.01); *H04L 63/123* (2013.01)

(58) Field of Classification Search
CPC ....... H04L 9/30; H04L 63/0428; H04L 9/321; H04L 9/088; H04L 9/0825; H04L 63/20; G06F 21/6245; G06F 21/6272
USPC .......................................................... 380/44
See application file for complete search history.

(56) References Cited

U.S. PATENT DOCUMENTS

| 6,035,402 | A | * | 3/2000 | Vaeth | ...................... H04L 9/321 713/158 |
| 8,737,614 | B1 | | 5/2014 | Mulligan | |
| 2003/0081785 | A1 | | 5/2003 | Boneh et al. | |
| 2004/0139314 | A1 | * | 7/2004 | Cook | ................... G06Q 10/107 713/151 |
| 2005/0060545 | A1 | | 3/2005 | Mont et al. | |
| 2009/0097660 | A1 | | 4/2009 | Malaviarachchi et al. | |
| 2010/0061556 | A1 | | 3/2010 | Whitehead | |
| 2010/0077214 | A1 | | 3/2010 | Jogand-Coulomb et al. | |
| 2010/0211781 | A1 | | 8/2010 | Auradkar et al. | |
| 2010/0217850 | A1 | | 8/2010 | Ferris | |
| 2010/0319004 | A1 | | 12/2010 | Hudson et al. | |

(Continued)

OTHER PUBLICATIONS

Takabi et al., Security and Privacy Challenges in Cloud Computing Environments, 2010, http://sefcom.asu.edu/publications/security-privacychallenges-privacy2010.pdf, pp. 24-31.

(Continued)

*Primary Examiner* — Mahfuzur Rahman
(74) *Attorney, Agent, or Firm* — Hewlett Packard Enterprise Patent Department

(57) ABSTRACT

Compliance to a policy about how to treat data in a computer network environment is ensured by checking that conditions in the policy are satisfied by the entity before access to the data is provided.

17 Claims, 5 Drawing Sheets

(56) References Cited

U.S. PATENT DOCUMENTS

2011/0047381 A1  2/2011  Ganesan et al.
2011/0055559 A1  3/2011  Li et al.
2011/0072486 A1  3/2011  Hadar et al.

OTHER PUBLICATIONS

The International Search Report and Written Opinin of the International Searching Authority; International Application No. PCTIUS2011/043581; International filing Date: Jul. 11, 2011.

* cited by examiner

POLICY-BASED DATA MANAGEMENT

CROSS-REFERENCE TO RELATED APPLICATIONS

This application is a continuation of and claims the benefit of U.S. patent application Ser. No. 14/125,685, which is the National Stage of International Application No. PCT/US2011/043581, filed Jul. 11, 2011, the entirety of which is incorporated herein by reference.

BACKGROUND

As the Internet gains popularity, more and more services are made available online, inviting users to disclose more private information to the service providers. However, currently there is no adequate solution that ensures data disclosed online will be treated according to agreed policies. As a result, users are reluctant to disclose private data to the online service providers.

DETAILED DESCRIPTION

The present subject matter is now described more fully with reference to the accompanying figures, in which several implementations of the subject matter are shown. The present subject matter may be implemented in many different forms and should not be construed as limited to the implementations set forth herein. Rather these implementations are provided so that this disclosure will be complete and will fully convey principles of the subject matter.

Example Network Environment without Storage Service

Figure 1:
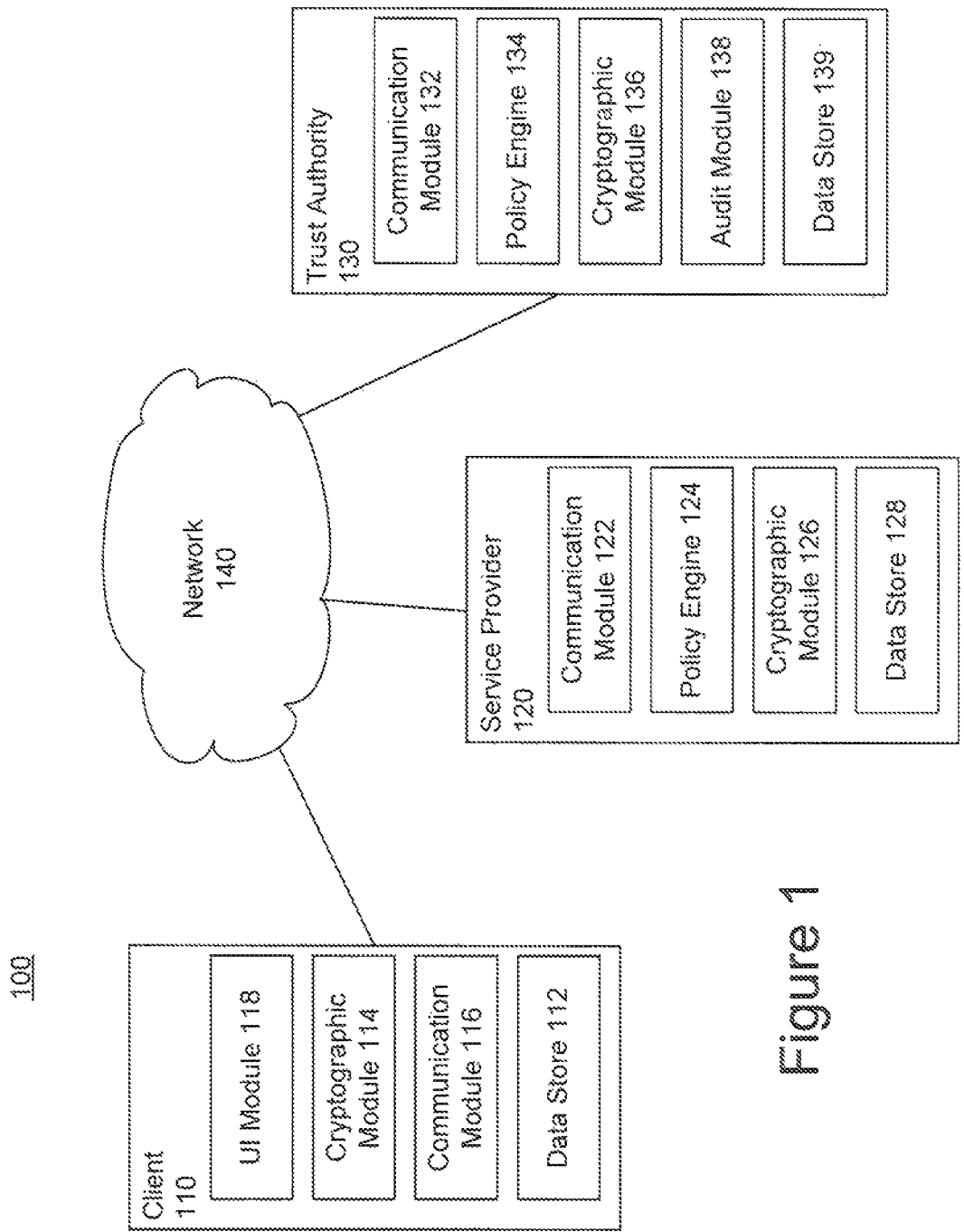
FIG. 1 is a diagram of an example of a network environment for ensuring data privacy policy compliance.

FIG. 1 illustrates one example of a network environment 100 in which an owner of private data (e.g., confidential personal data such as health information, credit card numbers) can establish one or more privacy policies that set out conditions for accessing the private data and ensure that the privacy policies are enforced in the network environment 100. The network environment 100 includes a client 110, a service provider 120, and a trust authority 130, all connected through a network 140. Only one of each type of entity is illustrated for clarity.

To ensure policy compliance, the client 110 generates one or more privacy policies for treating private data (or attributes of the private data), encrypts the private data, and transmits the encrypted data along with the privacy policies to the service provider 120. Upon receipt of the encrypted data and the privacy policies, the service provider 120 forwards the privacy policies (and not the encrypted data) to the trust authority 130. The trust authority 130 logs communications with the client 110 in an audit trail, and determines whether all conditions set out in the privacy policies for treating the private data will be complied with by the service provider 120. To make the determination, the trust authority 130 may request the service provider 120 to provide a message containing an assurance that the privacy policies will be complied with by the service provider 120 (the "assurance message"), and determine whether the provided assurance message is acceptable (e.g., whether the service provider 120 can satisfy all policy conditions). If it is determined that all conditions in the privacy policies will be complied with by the service provider 120, the trust authority 130 provides the service provider 120 with one or more cryptographic keys. Upon receipt of the cryptographic keys, the service provider 120 decrypts the encrypted data using the cryptographic keys and uses the private data according to the privacy policies. In this example the service provider 120 has no access to the cryptographic keys needed to decrypt the encrypted data before providing an acceptable assurance that it will comply with the associated privacy policies. The trust authority 130 has no access to the encrypted data and therefore has no access to the private data. Examples of cryptographic schema used to encrypt/decrypt data in the network environment 100 to ensure policy compliance include the Public Key Infrastructure (PKI) and the Identity-Based Encryption (IBE). In PKI, an entity (e.g., the client 110, the service provider 120, the trust authority 130) has a published public key that binds with an identity of that entity and a corresponding unpublished private key. The public/private key pair is certified by a trusted certification authority and can be used as asymmetric keys to encrypt/decrypt messages.

In one example, the client 110 is a computer system that includes a user interface (UI) module 118, a cryptographic module 114, a communication module 116, and a data store 112. The UI module 118 provides an interface (e.g., an interactive display window) for a user to define (or establish, generate) a privacy policy for a set of private data residing on (or that can be accessed at) the client 110.

A privacy policy sets out machine-readable conditions for treating (e.g., accessing, using) a set of private data that are to be followed. A privacy policy can include various information relating to restricting access/usage of the associated private data, such as: (1) a list of acceptable trust authorities 130, (2) allowed usage of the private data, such as using the private data only for certain purposes, (3) prohibited usage of the private data, such as prohibiting sharing the private data with a particular entity, (4) an expiration date of the privacy policy, (5) a security parameter of a computing platform being used by the service provider 120, (6) an action to be performed by the trust authority 130 such as communicating with the client 110 before providing a cryptographic key to the service provider 120, and (7) acceptable degrees of assurance to be provided by the service provider 120 about compliance to the privacy policy. As shown in the following example privacy policy, a privacy policy can be expressed in any suitable language, such as the Extensible Markup Language (XML), and may follow a set of predetermined grammar rules and/or semantics rules that can be understood by the service provider 120 and the trust authority 130.

```
<policy>
    <expiration date>
    expiration date
    </expiration date>
    <trust authority list>
    identities of acceptable trust authorities
    </trust authority list>
```

-continued

```
    <owner>
      identity of data owner
    </owner>
    <constraint>
      require_strong_X.509_authentication
    </constraint>
    <constraint>
      allow_usage_of_data_#1
    </constraint>
    <action>
      notify_user
    </action>
  </policy>
```

It may be beneficial to include multiple interchangeable trust authorities 130 in the privacy policy because some of these trust authorities 130 may not be available online all the time or have limited connectivity. Thus, by including multiple trust authorities 130 in a privacy policy, the service provider 120 can switch from one trust authority 130 to another trust authority 130 based on need, and thereby the risk of business disruptions and delays caused by an unresponsive trust authority 130 may be greatly reduced. In addition, the privacy policy may require multiple assurances from multiple trust authorities 130.

Multiple privacy policies may be created for different attributes (or components, sets) of the private data such that different conditions can be set on different items of the private data. For example, contacting information (e.g., email address) may be subject to less stringent access requirements compared to financial information (e.g., credit card number) and health information (e.g., health history). Through the UI module 118, a user may specify the granularity of how multiple privacy policies apply to attributes or items of the private data. The user may either create the conditions for a privacy policy from scratch or select conditions that are acceptable by the service provider 120 and/or the trust authority 130 (e.g., conditions in acceptable privacy policies published by the service provider 120). The user may also select the trust authorities 130 to be included in the privacy policy (e.g., from a list of trust authorities 130 that the service provider 120 accepts).

The cryptographic module 114 encrypts a set of private data subject to a privacy policy into encrypted data by applying an encryption algorithm (e.g., a symmetric encryption algorithm as specified in ISO (International Standards Organization)/IEC (International Electrotechnical Commission) 18033-3) using a cryptographic key (e.g., a locally generated symmetric key), and generates a sticky policy for the encrypted data to ensure that the corresponding privacy policy will be audited and assurance of policy compliance provided. In one example, to generate the sticky policy, the cryptographic module 114 generates an encrypted package by applying a signcryption algorithm (e.g., as specified in ISO/IEC 29150) to the cryptographic key and the privacy policy using a private key of the client and a public key of the trust authority 130, and includes a copy of the privacy policy along with the encrypted package in the sticky policy, as illustrated in the following equation:

$$\text{sticky policy} = \text{privacy\_policy} + \text{sigenc}(\text{priv}_{client}, \text{pub}_{trust\_authority}, \text{symmetric\_key} + \text{privacy\_policy}), \quad (1)$$

where symmetric_key denotes the cryptographic key for decrypting the encrypted data, privacy_policy denotes the privacy policy, + denotes a join (or concatenation) operation, $\text{pub}_{trust\_authority}$ denotes the public key of the trust authority 130, $\text{priv}_{client}$ denotes the private key of the client 110, and sigenc ($K_1$, $K_2$, X) denotes applying a signcryption algorithm to X using $K_1$ and $K_2$ as cryptographic keys. In another example, to generate the sticky policy, the cryptographic module 114 generates a digital signature on the privacy policy with $\text{priv}_{client}$ (e.g., by applying a signing algorithm as specified in ISO/IEC 14888 or ISO/IEC 9796) and encrypts the digital signature along with symmetric_key into an encrypted package using $\text{pub}_{trust\_authority}$ (e.g., by applying an asymmetric encryption algorithm as specified in ISO/IEC 18033-2), and includes privacy_policy along with the encrypted package in the sticky policy, as illustrated by the following equation:

$$\begin{aligned}\text{sticky policy} = &\text{privacy\_policy} + \text{enc}(\text{pub}_{trust\_authority}, \\ &\text{symmetric\_key} + \text{privacy\_policy} + \text{client\_name}) + \\ &\text{sig}(\text{priv}_{client}, \text{enc}(\text{pub}_{trust\_authority}, \text{symmetric\_key} + \\ &\text{privacy\_policy} + \text{client\_name}) + \\ &\text{trust\_authority\_name}),\end{aligned} \quad (2)$$

where client_name denotes an identifier of the client 110, trust_authority_name denotes an identifier of the trust authority 130, enc (K, X) denotes applying an encryption algorithm to X using K as the encryption key, and sig (K, Y) denotes applying a signing algorithm to Y using K as the cryptographic key.

To support multiple trust authorities 130, the cryptographic module 114 generates multiple encrypted packages, one for each trust authority 130 and is encrypted (or signcrypted) using the public key of that trust authority 130, and includes the multiple encrypted packages in the sticky policy. Because the encrypted data cannot be decrypted without the symmetric key, which is signcrypted or encrypted along with a signed copy of the privacy policy in the sticky policy, the sticky policy (1) ensures that the privacy policy accompanies (or sticks to) the associated private data and policy constraints will be audited and degrees of assurance provided, and (2) can be used to verify the integrity of the privacy policy. Below is an example data package (e.g., of a message) containing encrypted data and a corresponding sticky policy expressed in XML:

```
<data package>
  <policy>
    privacy_policy
  </policy>
  <encrypted package>
    enc (pub_trust_authority_1, symmetric_key + privacy_policy +
    client_name) + sig (priv_client, enc (pub_trust_authority_1, symmetric_key +
    privacy_policy + client_name) + trust_authority_name_1)
  </encrypted package>
  <encrypted package>
    enc (pub_trust_authority_2, symmetric_key + privacy_policy +
    client_name) + sig (priv_client, enc (pub_trust_authority_2, symmetric_key +
    privacy_policy + client_name) + trust_authority_name_2)
  </encrypted package>
  <encrypted data>
    encryption(symmetric_key, privacy_data)
  </encrypted data>
</data package>
```

The communication module 116 communicates with the service provider 120 and the trust authority 130 through the network 140. Example communications include receiving acceptable privacy policies from the service provider 120 and/or the trust authority 130, transmitting the encrypted data and the accompanying sticky policy to the service provider 120, and exchanging messages with the trust authority 130 regarding the private data and/or the associated privacy policy. To further enhance security, the communication module 116 may communicate with an entity (e.g., the service provider 120, the trust authority 130) by first establishing a secured communication channel using cryptographic protocols such as Transport Layer Security (TLS) and Secure Sockets Layer (SSL), and then communicate with the entity through the secured channel.

The data store 112 stores data used by the client 110. Examples of the data stored in the data store 112 include private data and associated privacy policies. The data store 112 may be a database (e.g., a relational database) stored on a non-transitory computer-readable storage medium (e.g., a hard disk drive).

The service provider 120 provides a service to users in the network environment 100 that utilizes private information provided by the users. In one example, the service provider 120 includes one or more computer systems configured to implement the service. In another example, the service is implemented in a cloud computing environment. As used herein, cloud computing refers to a style of computing in which dynamically scalable and often virtualized resources are provided as a service over the Internet. Thus, cloud computing customers may not own the physical infrastructure serving as host to the software platform in question, but instead rent usage of resources from a third-party provider, where consume these resources as a service and pay only for resources used. The service provider 120 may utilize services or functions of other entities (e.g., other service providers 120) to provide the service to the users.

The service provider 120 includes a communication module 122, a policy engine 124, a cryptographic module 126, and a data store 128. The communication module 122 communicates with the client 110 and the trust authority 130 through the network 140. Example communications include publishing a policy (a "Manifesto") including a list of supported conditions and trust authorities 130, receiving from the client 110 encrypted data and sticky policies, transmitting to the trust authority 130 sticky policies or the assurance messages, and receiving from the trust authority 130 cryptographic keys or requests for the assurance messages.

Upon receiving a sticky policy, the policy engine 124 interprets a privacy policy in the sticky policy (e.g., according to a set of predetermined grammar rules and/or semantics rules) to determine whether the privacy policy is valid (e.g., whether expired, authentic) and whether conditions in the privacy policy is acceptable (e.g., whether the service provider 120 can satisfy all policy conditions). If the privacy policy is invalid or unacceptable, the policy engine 124 works with the communication module 122 to transmit to the client 110 an error message or ignores the privacy policy and the associated encrypted data altogether. Otherwise (i.e., the privacy policy is valid and acceptable), the policy engine 124 works with the communication module 122 to forward the sticky policy to an acceptable trust authority 130 (e.g., as listed in the privacy policy). The policy engine 124 generates an assurance message including a statement claiming that all conditions in the privacy policy will be complied by the service provider 120 (the assurance statement) digitally signed with the private key of the service provider 120, and transmits the assurance message to the trust authority 130. The assurance message may be transmitted to the trust authority 130 together with the sticky policy or separately (e.g., the assurance message is generated and/or transmitted in response to a request from the trust authority 130 after the sticky policy is transmitted). The policy engine 124 may work with the communication module 122 to exchange multiple messages with the trust authority 130 to provide adequate assurance. For example, the trust authority 130 may find the initial assurance statement unacceptable and request further assurance. In response, policy engine 124 generates and transmits to the trust authority 130 one or more additional assurance messages. Once the private data is decrypted, the policy engine 124 makes sure that the conditions in the privacy policy are complied with according to the assurance given to the trust authority 130. Multiple privacy policies may be bound to different attributes of the encrypted private data. Depending on the attributes the service provider 120 wants to access, the policy engine 124 may forward all or a subset of the sticky policies to the trust authority 130 and provide assurance messages for such policies.

The cryptographic module 126 performs cryptographic functions such as decrypting the encrypted package in the sticky policy, verifying the integrity of the privacy policy using the digital signature in the encrypted package, digitally signing the assurance statement, and decrypting the encrypted data using the cryptographic key provided by the trust authority 130.

The data store 128 stores data used by the service provider 120. Examples of the data stored in the data store 128 include decrypted private data, associated privacy policies, and assurance messages sent to the trust authority 130. The data store 128 may be a database stored on a non-transitory computer-readable storage medium.

The trust authority 130 ensures that a privacy policy for a set of private data will be complied with by the service provider 120 before providing the service provider 120 with access to the private data. The trust authority 130 also provides compliance checking capacities by generating an audit trail regarding the disclosure of the private data and attempted accesses to it. Similar to the service provider 120, the trust authority 130 may implement its functionality through one or more computer systems or in a cloud computing environment, and may utilize services or functions of other entities (e.g., an audit service provider) to provide its service/capacities. In one example, rather than the trust authority 130 being separate from the client 110, the client 110 can be arranged to run trust authority services itself in order to have first hand understanding of what happens to its private data and make ultimate decisions about release of cryptographic keys. Additional or alternatively, the functions of the trust authority 130 may be implemented by the same computer systems or in the same cloud computing environment of the service provider 120.

The trust authority 130 includes a communication module 132, a policy engine 134, a cryptographic module 136, an audit module 138, and a data store 139. The communication module 132 communicates with the client 110 and the service provider 120 through the network 140. Example communications include receiving from the service provider 120 sticky policies and assurance messages, transmitting to the service provider 120 cryptographic keys or requests for the assurance messages, and exchanging messages with the client 110 regarding privacy policies, private data, and/or the audit trail.

Upon receiving a sticky policy, the policy engine 134 works with the cryptographic module 136 to verify the integrity of the privacy policy in the sticky policy, interprets the privacy policy (e.g., according to a set of predetermined grammar rules and/or semantics rules) to determine whether the privacy policy is valid and the necessary assurance required from the service provider 120 before access to the associated private data can be granted. If the privacy policy is valid and compliance assurance is needed from the service provider 120, the policy engine 134 works with the communication module 132 to transmit a request for assurance.

Upon receiving an assurance message, the policy engine 134 interprets the privacy policy and the assurance message to determine whether the message is acceptable (e.g., whether information in the assurance message satisfies all the conditions in the privacy policy), and if acceptable then works with the cryptographic module 136 to transmit a cryptographic key to the service provider 120. Certain conditions in the privacy policy may not rely on information from the service provider 120 to be satisfied, such as: (1) an action condition requiring the trust authority 130 to notify the client 110 or to seek its explicit authorization for release of the cryptographic key, (2) an action condition requiring the trust authority 130 to verify that the service provider 120 is not on a blacklist (or is on a whitelist), and (3) an action condition requiring the trust authority 130 to check platforms and/or components (e.g., hardware components) of the service provider 120. To enhance security, the cryptographic key may be re-encrypted using the public key of the service provider 120. If one or more of the policy conditions are not satisfied, the policy engine 134 works with the communication module 132 to notify the service provider 120 accordingly (e.g., requesting additional assurance for such policy conditions) and the trust authority 130 does not generate or transmit to the service provider 120 the requested cryptographic key. Because the trust authority 130 receives from the service provider 120 the sticky policy and not the encrypted data, the trust authority 130 would not have access to the private data even though it can determine the cryptographic key for decrypting the encrypted data.

The cryptographic module 136 performs cryptographic functions such as decrypting the encrypted package in the sticky policy, verifying the integrity of the privacy policy using the digital signature in the encrypted package, and decrypting the cryptographic key in the encrypted package using the private key of the trust authority 130 if and when the policy engine 134 is satisfied that all policy conditions have been met. The cryptographic key can be decrypted at the same time as, or even before, the policy conditions are checked; in this case, the cryptographic key is not, however, released to the service provider 120 until the conditions are all found to be satisfied.

Whether or not the policy engine 134 is satisfied with the assurance message, the audit module 138 generates an audit record comprising the identities of the client 110 and the service provider 120, the identity of (or a reference to) the associated private data, and the information used to satisfy—or failing to satisfy—each policy condition. This audit record is stored to provide an audit trail regarding the disclosure of the private data and attempted accesses to it; this audit trail can be used latter as evidence for future contentions or forensic analysis. Thus, if the service provider 120 discloses or uses the private data in a way that is inconsistent with the associated privacy policy, there is an audit trail at the trust authority 130 showing that the service provider 120 knew about the policy and agreed to comply with it. In case of identity or profile thefts, the audit information can be used to pin down a list of potential "offenders" and carry on forensic analysis. Enforcing the tracing and auditing of disclosures makes the information recipients more accountable.

The data store 139 stores data used by the trust authority 130. Examples of the data stored in the data store 139 include privacy policies and the audit trail. The data store 139 may be a database stored on a non-transitory computer-readable storage medium.

The network 140 is configured to connect the client 110, the service provider 120, and the trust authority 130. The network 140 may be a wired or wireless network. Examples of the network 440 include the Internet, an intranet, a WiFi network, a WiMAX network, a mobile telephone network, or a combination thereof.

Figure 2:
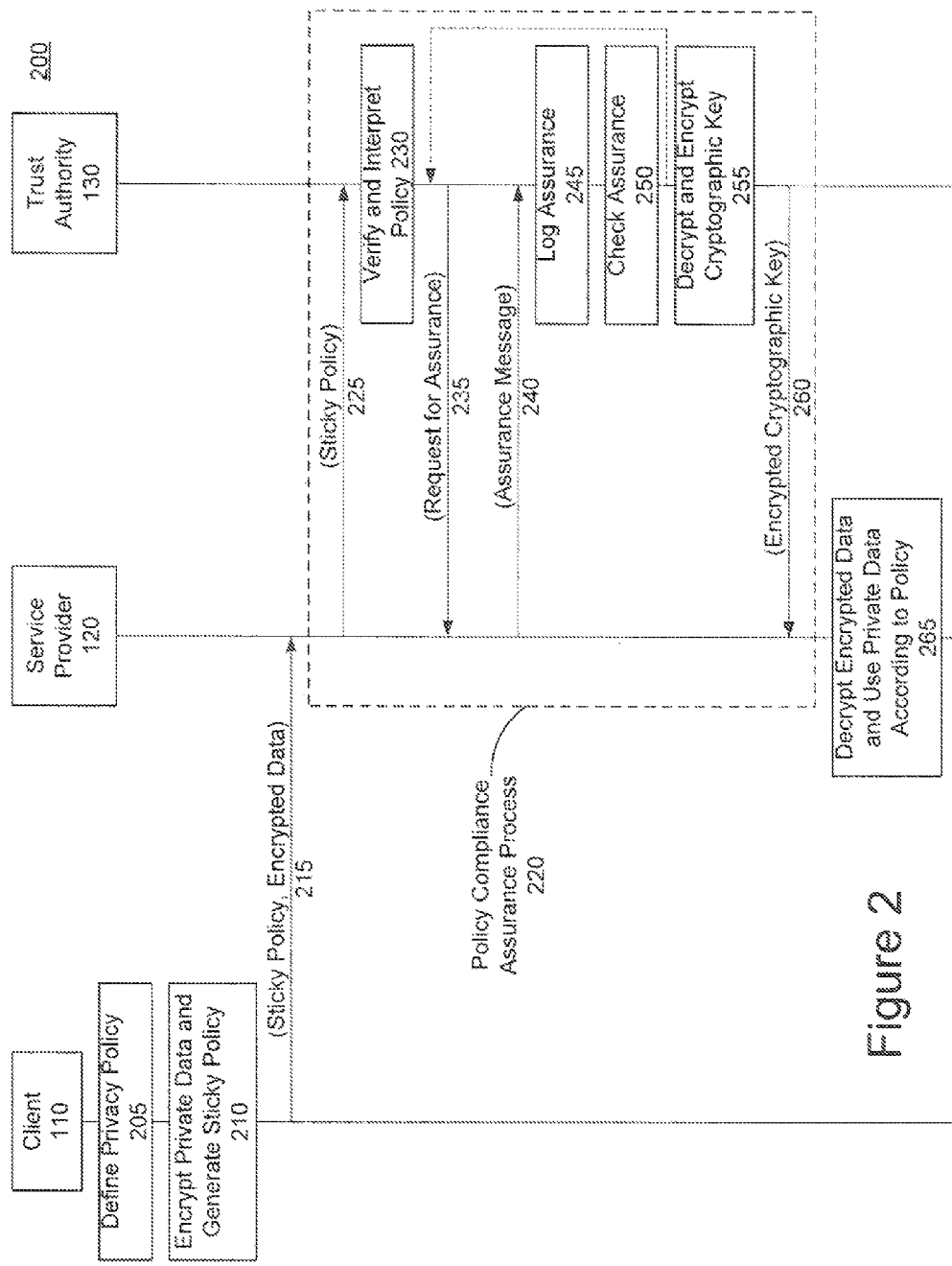
FIG. 2 is a ladder diagram of an example of a method of ensuring privacy policy compliance in the network environment shown in FIG. 1.

FIG. 2 is a ladder diagram showing an example of a method 200 of ensuring privacy policy compliance in the network environment 100. Other examples perform the steps in different orders and/or perform different or additional steps than the ones shown.

The client 110 defines 205 a privacy policy for private data, encrypts 210 the private data residing thereon using a symmetric key, and generates 210 a sticky policy to bind the private data and the privacy policy together. Thereafter, the client 110 transmits 215 the encrypted data along with the sticky policy to the service provider 120. As described herein, the client 110 may define multiple privacy policies that set forth different conditions for treating different attributes of the private data. The attributes subject to different privacy policies are encrypted using different symmetric keys, and multiple sticky policies are created for the private data.

Upon receiving the encrypted data and the sticky policy, the service provider 120 optionally verifies and interprets the privacy policy enclosed in the sticky policy, and engages the trust authority 130 in a policy compliance assurance process 220 with the trust authority 130 in order to gain access to the private data. During the policy compliance assurance process 220, the service provider 120 forwards 225 the sticky policy to the trust authority 130. Upon receiving the sticky policy, the trust authority 130 verifies and interprets 230 the privacy policy in the sticky policy and transmits 235 to the service provider 120 a request for assurance. Upon receiving the request, the service provider 120 provides 240 the trust authority 130 with an assurance message. Upon receiving the assurance message, the trust authority 130 logs 245 the assurance message as an audit record in the audit trail and checks 250 the assurance message to determine whether it is acceptable. If the assurance message is not acceptable, steps 235 through 250 may repeat once or multiple times (as indicated by the dotted line in FIG. 2) such that the trust authority 130 may request, and the service provider 120 may provide, additional assurance. Alternatively or additionally, the trust authority 130 may decide to terminate the policy compliance assurance process 220 upon determining that the assurance message is not acceptable. If the assurance message is acceptable, the trust authority 130 decrypts 255 the cryptographic key in the sticky policy, re-encrypts 255 the decrypted cryptographic key using the public key of the service provider 120, and transmits 260 the re-encrypted cryptographic key to the service provider 120, which ends the policy compliance assurance process 220.

Upon receipt of the re-encrypted cryptographic key, the service provider 120 decrypts the re-encrypted cryptographic key using its private key, decrypts the encrypted data using the cryptographic key, and uses the private data according to the privacy policy. If multiple privacy policies are applicable to the private data, the service provider 120 forwards the multiple sticky policies to the trust authority 130, obtains multiple cryptographic keys from the trust authority through the policy compliance assurance process 220, and decrypts the applicable attributes of the private data using the cryptographic keys.

The method 200 can be expanded to enable the service provider 120 to propagate the private data to other service providers 120, assuming such disclosure is not prohibited in the associated privacy policy. To disclose the private data to other service providers 120, the service provider 120 may add additional (or more stringent) constraints to the original privacy policy to form a new privacy policy, and then create a new sticky policy and distribute the encrypted data along with the new sticky policy to the other service providers 120 as the client 110 according to the method 200.

Example Network Environment with Storage Service

Figure 3:
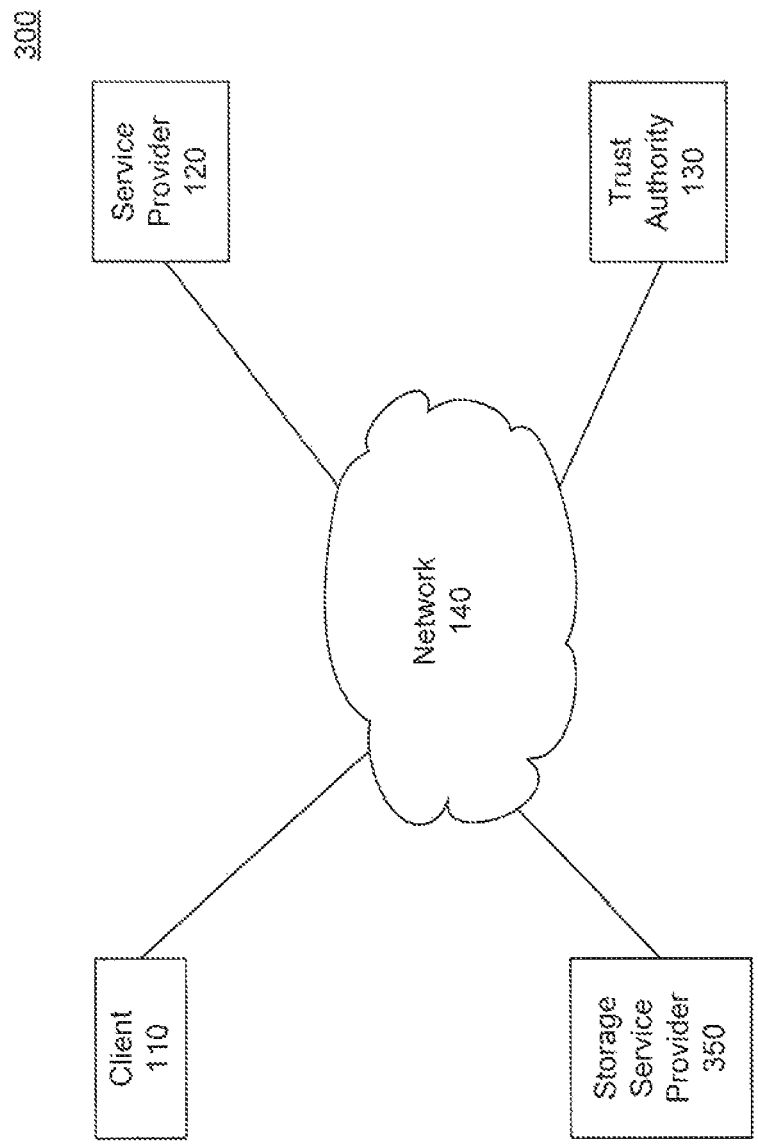
FIG. 3 is a diagram of another example of a network environment for ensuring data privacy policy compliance.

FIG. 3 illustrates another example of a network environment 300 in which compliance with privacy policies for private data is ensured. Similar to the network environment 100 in FIG. 1, the network environment 300 includes a client 110 for establishing the privacy policy for private data, a server provider 120 for providing a service utilizing the private data, and a trust authority 130 for ensuring that the service provider 120 accesses and/or uses the private data according to the privacy policy, all connected through a network 140. In addition, the network environment 300 includes a storage service provider 350 that provides a storage service to users in the network environment 300. Users such as the owner of the private data can store data using the storage service and share the stored data with others. Similar to the service provider 120, the functions of the storage service provider 350 can be implemented by one or more computer systems or in a cloud computing environment.

In the network environment 300, the client 110 encrypts private data using a symmetric key $K_1$ and stores the encrypted data in the storage service provided by the storage service provider 350. The encrypted data in the storage service can be retrieved using a reference (e.g., a uniform resource locator (URL)) that uniquely identifies the encrypted data. The client 110 encrypts the reference using a symmetric key $K_2$ (or $K_1$), generates a sticky policy for the encrypted private data that includes an encryption of both $K_1$ and $K_2$, and transmits the sticky policy along with the encrypted reference to the service provider 120. Upon receipt of the encrypted reference and the sticky policy, the service provider 120 forwards the sticky policy (and not the encrypted reference) to the trust authority 130. The trust authority 130 logs communications with the client 110 in an audit trail, and determines whether all conditions set out in the privacy policies for treating the private data will be complied. To make the determination, the trust authority 130 may request the client 110 to provide a message containing an assurance that the privacy policies will be complied (the "assurance message"), and determine whether the provided assurance message is acceptable (e.g., whether the service provider 120 can satisfy all policy conditions). Multiple requests and assurance messages may be exchanged between the trust authority 130 and the service provider 120 before the trust authority makes the determination. If it is determined that all conditions in the privacy policies will be complied with, the trust authority 130 provides the service provider 120 with $K_1$ and $K_2$. Upon receipt of the cryptographic keys $K_1$ and $K_2$, the service provider 120 decrypts the encrypted reference using $K_2$, and retrieves the encrypted data from the storage service provider 350 using the reference. Upon receipt of the encrypted data, the service provider 120 decrypts the encrypted data using $K_1$, and uses the private data according to the privacy policy. In this example the service provider 120 has no access to the encrypted data nor the cryptographic key needed to decrypt the encrypted data before providing an acceptable assurance that the associated privacy policy will be complied. The trust authority 130 has no access to the encrypted reference/data and therefore has no access to the private data.

Figure 4:
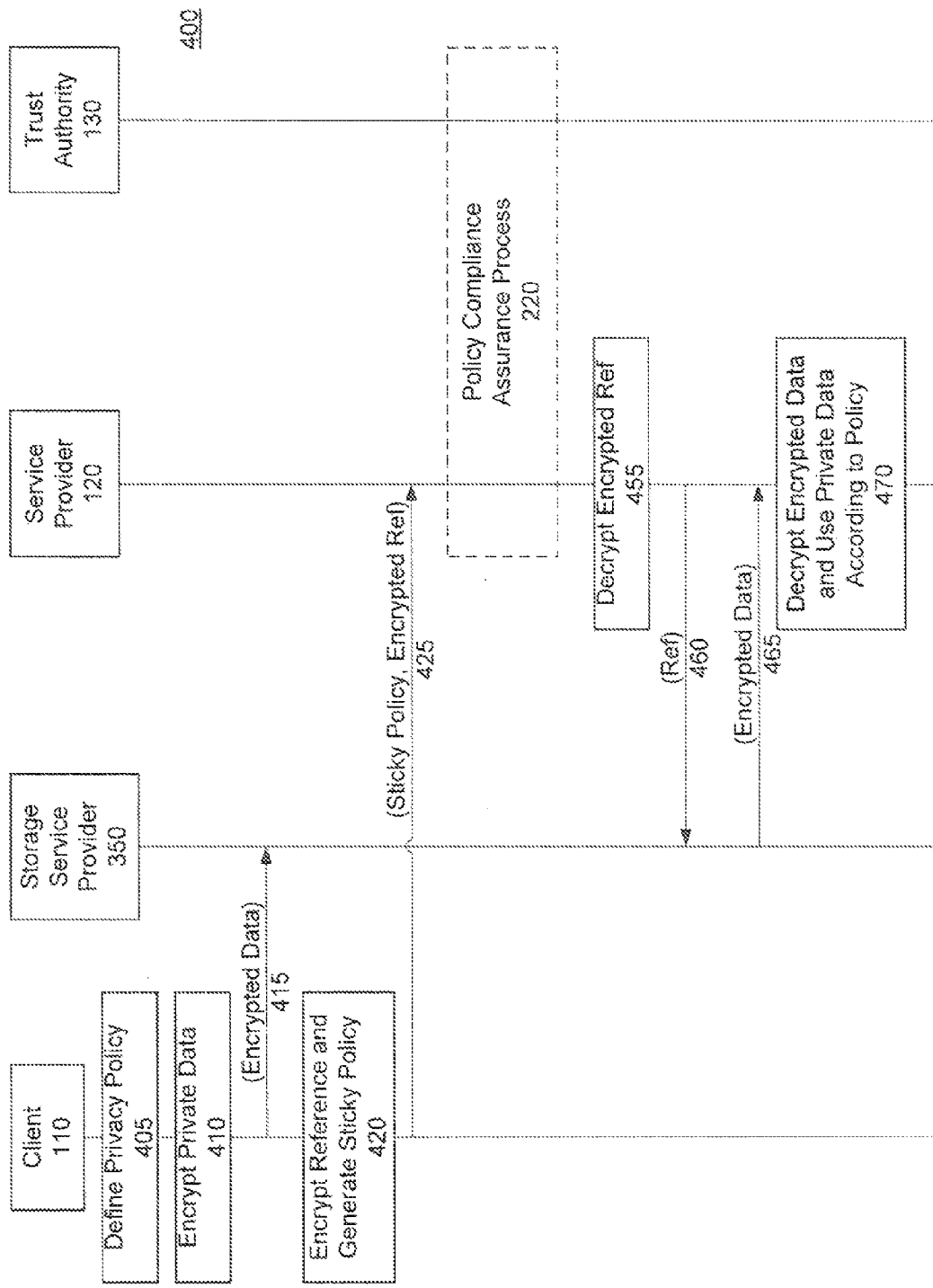
FIG. 4 is a ladder diagram of an example of a method of ensuring privacy policy compliance in the network environment shown in FIG. 3.

FIG. 4 is a ladder diagram showing an example of a method 400 of enforcing privacy policy compliance in the network environment 300. Other examples perform the steps in different orders and/or perform different or additional steps than the ones shown.

The client 110 defines 405 a privacy policy for private data, encrypts 410 the private data resided thereon using a symmetric key $K_1$, and transmits 415 the encrypted data to the storage service provider 350 to be stored at a location identified by a reference. The client 110 encrypts 420 the reference using a symmetric key $K_2$, generates 420 a sticky policy, and transmits 425 the sticky policy along with the encrypted reference to the service provider 120. In one example, to generate the sticky policy, the client 110 generates an encrypted package by applying a signcryption algorithm to $K_1$, $K_2$ and privacyfi_policy using $priv_{client}$ and $pub_{trust\_authority}$, and includes privacy_policy along with the encrypted package in the sticky policy, as illustrated in the following equation:

$$\text{sticky policy}=\text{privacy\_policy}+\text{sigenc}(priv_{client}, pub_{trust\_authority}, K_1+K_2+\text{privacy\_policy}). \quad (3)$$

In another example, to generate the sticky policy, the client 110 generates a digital signature on privacy_policy with $priv_{client}$ and encrypts the digital signature along with $K_1$ and $K_2$ into an encrypted package using $pub_{trust\_authority}$, and includes privacy policy along with the encrypted package in the sticky policy, as illustrated by the following equation:

$$\text{sticky policy}=\text{privacy\_policy}+\text{enc}(pub_{trust\_authority}, K_1+K_2+\text{privacy\_policy}+\text{client\_name})+\text{sig}(priv_{client}, \text{enc}(pub_{trust\_authority}, K_1+K_2+\text{privacy\_policy}+\text{client\_name})+\text{trust\_authority\_name}). \quad (4)$$

The client 110 may also transmit 425 to the service provider 120 a hash value of the reference generated by applying a hash function to the reference, such that the service provider 120 may check the integrity of the reference using the hash value.

Upon receiving the encrypted reference and the sticky policy, the service provider 120 optionally verifies and interprets the privacy policy enclosed in the sticky policy, and engages the trust authority 130 in a policy compliance assurance process 220 with the trust authority 130 to gain access to the private data. The process 220 is described above in detail with regard to FIG. 2. Because the sticky policy includes encrypted cryptographic keys $K_1$ and $K_2$, the trust authority 130 returns both keys to the service provider 120 upon determining that the assurance message is acceptable.

Upon receipt of the re-encrypted cryptographic keys $K_1$ and $K_2$, the service provider 120 decrypts the re-encrypted cryptographic keys using its private key, decrypts 455 the encrypted reference using $K_1$, transmits 460 the reference to the storage service provider 350, and retrieves 465 the encrypted data from the storage service provider 350. Upon receipt of the encrypted data, the service provider 120 decrypts 470 the encrypted data using $K_1$, and uses the private data according to the privacy policy.

Similar to the method 200, multiple privacy policies may have been defined to different attributes of the private data, the privacy policy may include multiple trust authorities 130, and the method 400 can be expanded to enable the service provider 120 to propagate the private data to other service providers 120.

Additional Implementations

Many variants are possible to the above described implementations. For example, instead of using symmetric keys to encrypt/decrypt private data and/or references, asymmetric keys may be used. Furthermore, the described implementations can be adapted to support multiple verification and control: instead of any trust authority 130 authorizing access (e.g. an OR condition), it could be multiple trust authorities (e.g. an AND condition). Each trust authority 130 could be provided with a key component (called a "share"). The service provider 120 would combine (e.g. an XOR operation) the components from different trust authorities to generate the cryptographic key needed to access the private data.

The described implementations can also be configured to support additional or alternative transmission mechanisms among entities such as the client 110, the service provider 120, the trust authority 130, and/or the storage service provider 350. For example, in the scenario without the storage service provider 350, instead of transmitting the encrypted data and the sticky policy to the service provider 120 through the network 140, the client 110 (or the communication module 116) can store the encrypted data and the sticky policy onto a non-transitory computer-readable storage medium such as a hard drive, and physically ship (or deliver) the storage medium to the service provider 120. The service provider 120 can then retrieve the sticky policy by reading the storage medium, and transmit the sticky policy and an assurance message to an acceptable trust authority 130 through the network 140. As another example, in the scenario with the storage service provider 350, the client 110 can ship to the storage service provider 350 a hard drive hosting the encrypted data, and, after the encrypted data become available at the storage service provider 350, transmit an encrypted reference to the encrypted data along with a sticky policy to the service provider 120 through the network 140. Further, some or all functions of the trust authority 130 can be provided by trusted applications hosted on entities such as the service provider 120, or by applications transmitted along with the sticky policy (e.g., stored in the storage medium that hosts the sticky policy and is shipped to the service provider 120).

The described implementations may allow tracing and auditing within the network environment via the trust authority 130 and may ensure enforcement of user privacy preferences by the service provider 120. In addition, the described implementations may provide flexibility as they enable multiple ways in which interactions could happen, which may be important to cloud computing environments where multiple interaction models might happen. Example variations include: (1) the user deciding whether to disclose encrypted data directly to the service provider 120 or instead to the storage service provider 350 in encrypted form, (2) the user deciding which and how many trust authorities 130 to use, and (3) the trust authority 130, in case encrypted private data is stored in the storage service provider 350, fetches the encrypted data from the storage service provider 350 and sends the encrypted data to the service provider 120 along with the cryptographic key.

Figure 5:
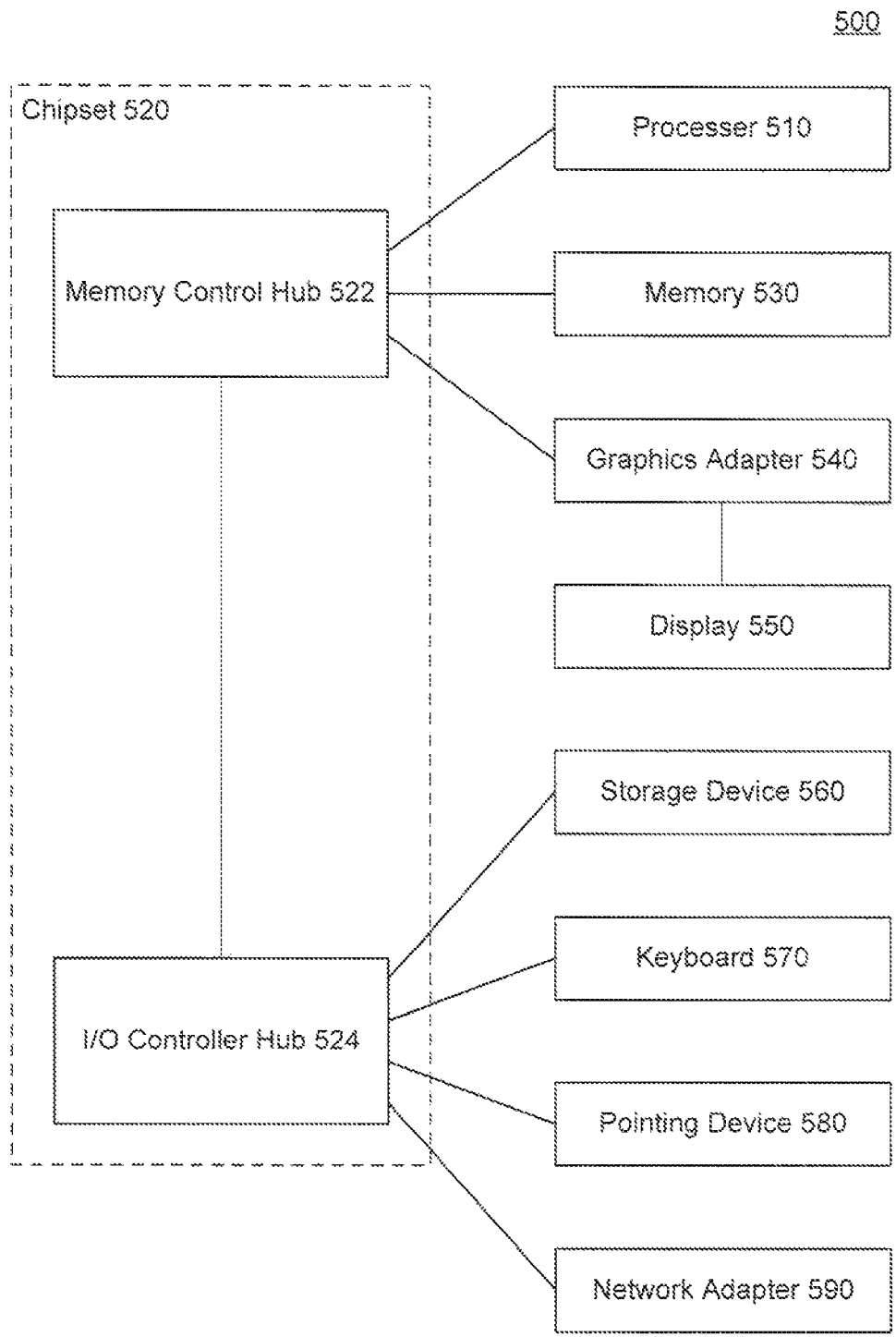
FIG. 5 is a diagram of an example of a computer system.

In one example, the entities shown in FIGS. 1-4 are implemented using one or more computer systems. FIG. 5 is a high-level block diagram illustrating an example computer system 500. The computer system 500 includes at least one processor 510 coupled to a chipset 520. The chipset 520 includes a memory controller hub 522 and an input/output (I/O) controller hub 524. A memory 530 and a graphics adapter 540 are coupled to the memory controller hub 522, and a display 550 is coupled to the graphics adapter 540. A storage device 560, a keyboard 570, a pointing device 580, and a network adapter 590 are coupled to the I/O controller hub 524. Other implementations of the computer system 500 have different architectures.

The storage device 560 is a non-transitory computer-readable storage medium such as a hard drive, compact disk read-only memory (CD-ROM), DVD, or a solid-state memory device. The memory 530 holds instructions and data used by the processor 510. The pointing device 580 is a mouse, track ball, or other type of pointing device, and is used in combination with the keyboard 570 to input data into the computer system 500. The graphics adapter 540 displays images and other information on the display 550. The network adapter 590 couples the computer system 500 to one or more computer networks.

The computer system 500 is adapted to execute computer program modules for providing functionality described herein. As used herein, the term "module" refers to computer program logic used to provide the specified functionality. Thus, a module can be implemented in hardware, firmware, and/or software. In one implementation, program modules are stored on the storage device 560, loaded into the memory 530, and executed by the processor 510.

The types of computer systems 500 used by entities can vary depending upon the implementation and the processing power required by the entity. For example, a trust authority might comprise multiple blade servers working together to provide the functionality described herein. As another example, a client 110 might comprise a mobile telephone with limited processing power. A computer system 500 can lack some of the components described above, such as the keyboard 570, the graphics adapter 540, and the display 550.

The configurations and methods described above and illustrated in the figures are merely examples; the described subject matter may be practiced and implemented using many other configurations and methods. It should also be noted that the language used in the specification has been principally selected for readability and instructional purposes, and may not have been selected to delineate or circumscribe the inventive subject matter. Accordingly, the disclosure of the described subject matter is intended to be illustrative, but not limiting, of the scope of the subject matter, which is set forth in the following claims.

What is claimed is:

1. A non-transitory computer-readable storage medium having computer program instructions recorded thereon for managing data in a computer network environment, the computer program instructions being executable by at least one processor of a trust authority to:
   receive, from a service provider in the computer network environment, a policy specifying how a piece of data should be treated and a first encryption package of a cryptographic key;
   verify an integrity of the policy using a digital signature received along with the policy;
   receive, from the service provider, a message stating that the policy will be followed by the service provider in treating the piece of data;
   decrypt the first encryption package of the cryptographic key;
   encrypt the cryptographic key into a second encryption package of the cryptographic key; and
   transmit, to the service provider and in response to receiving the message from the service provider, the second encryption package of the cryptographic key.

2. The non-transitory computer-readable storage medium of claim 1, wherein the first encryption package is encrypted using a public key associated with the trust authority, a private key corresponding to the public key is accessible by the trust authority, and the second encryption package is encrypted using a public key associated with the service provider.

3. The non-transitory computer-readable storage medium of claim 1, wherein the computer program instructions are further executable to:
  determine whether the message is acceptable according to the policy, and wherein the second encryption package of the cryptographic key is transmitted to the service provider in response to the message being determined acceptable.

4. The non-transitory computer-readable storage medium of claim 1, wherein the policy comprises a plurality of conditions for treating the piece of data, the message states that all of the plurality of conditions in the policy will be complied with by the service provider, and the message further comprises a digital signature of the message.

5. The non-transitory computer-readable storage medium of claim 1, wherein the computer program instructions are further executable to:
  store a copy of the message in a data store.

6. The non-transitory computer-readable storage medium of claim 3, wherein the computer program instructions are further executable to:
  generate an audit record comprising:
    an identity of a client associated with the piece of data;
    an identity of the service provider; and
    information used to determine whether the message is acceptable.

7. A method for managing data in a computer network environment, comprising:
  receiving, from a service provider, a policy specifying how a piece of data should be treated and a first encryption package of a cryptographic key;
  verifying an integrity of the policy using a digital signature received along with the policy;
  transmitting, to the service provider, a request for assurance that the policy will be followed by the service provider in treating the piece of data;
  receiving, from the service provider, a message indicating that the service provider will follow the policy in treating the piece of data;
  decrypting the first encryption package of the cryptographic key;
  encrypting the cryptographic key in a second encryption package; and
  transmitting, to the service provider, the second encryption package.

8. The method of claim 7, wherein the first encryption package is encrypted using a public key associated with the trust authority, a private key corresponding to the public key is accessible by the trust authority, and the second encryption package is encrypted using a public key associated with the service provider.

9. The method of claim 7, further comprising:
  determining whether the message is acceptable according to the policy, and wherein the second encryption package of the cryptographic key is transmitted to the service provider in response to the message being determined acceptable.

10. The method of claim 7, wherein the policy comprises a plurality of conditions for treating the piece of data, the message states that all of the plurality of conditions in the policy will be complied with by the service provider, and the message further comprises a digital signature of the message.

11. The method of claim 7, further comprising:
  storing a copy of the message in a data store.

12. The method of claim 9, further comprising:
  generating an audit record comprising:
    an identity of a client associated with the piece of data;
    an identity of the service provider; and
    information used to determine whether the message is acceptable.

13. An apparatus for managing data in a computer network environment, comprising:
  at least one data processor; and
  a data storage device storing instructions that, when executed, cause the at least one data processor to:
    receive, from a service provider, a policy specifying how a piece of data should be treated and a first encryption package of a cryptographic key;
    verify an integrity of the policy using a digital signature received along with the policy;
    transmit, to the service provider, a request for assurance that the policy will be followed by the service provider in treating the piece of data;
    receive, from the service provider, a message indicating that the service provider will follow the policy in treating the piece of data;
    decrypt the first encryption package of the cryptographic key;
    encrypt the cryptographic key in a second encryption package; and
    transmit, to the service provider, the second encryption package.

14. The apparatus of claim 13, wherein the first encryption package is encrypted using a public key associated with the trust authority, a private key corresponding to the public key is accessible by the trust authority, and the second encryption package is encrypted using a public key associated with the service provider.

15. The apparatus of claim 13, wherein the instructions further cause the at least one data processor to:
  determine whether the message is acceptable according to the policy, and wherein the second encryption package of the cryptographic key is transmitted to the service provider in response to the message being determined acceptable.

16. The apparatus of claim 13, wherein the policy comprises a plurality of conditions for treating the piece of data, the message states that all of the plurality of conditions in the policy will be complied with by the service provider, and the message further comprises a digital signature of the message.

17. The apparatus of claim 15, wherein the instructions further cause the at least one data processor to:
  generate an audit record comprising:
    an identity of a client associated with the piece of data;
    an identity of the service provider; and
    information used to determine whether the message is acceptable.

* * * * *